United States Patent
Kumar et al.

(10) Patent No.: US 10,581,718 B2
(45) Date of Patent: *Mar. 3, 2020

(54) WIRELESS DEVICES UNDER TEST

(71) Applicant: Contec, LLC, Schenectady, NY (US)

(72) Inventors: Samant Kumar, San Jose, CA (US); Dinesh Kumar, Bihar (IN); Shivashankar Diddimani, Karnataka (IN); Gunjan Samaiya, Madhya Pradesh (IN); Ina Huh, Morgan Hill, CA (US); Jin Ryu, San Jose, CA (US)

(73) Assignee: Contec, LLC, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,689

(22) Filed: Dec. 11, 2018

(65) Prior Publication Data

US 2019/0109778 A1    Apr. 11, 2019

Related U.S. Application Data

(63) Continuation of application No. 15/813,838, filed on Nov. 15, 2017, now Pat. No. 10,230,617, which is a continuation of application No. 14/948,925, filed on Nov. 23, 2015, now Pat. No. 9,838,295.

(51) Int. Cl.
  *H04L 12/26* (2006.01)
  *H04W 84/12* (2009.01)

(52) U.S. Cl.
  CPC ............. *H04L 43/50* (2013.01); *H04L 43/12* (2013.01); *H04L 43/14* (2013.01); *H04W 84/12* (2013.01)

(58) Field of Classification Search
  CPC ........ H04W 84/12; H04L 43/50; H04L 43/12; H04L 43/14
  USPC ........................................................ 370/241
  See application file for complete search history.

(56) References Cited

U.S. PATENT DOCUMENTS

| | | | |
|---|---|---|---|
| 5,005,197 | A | 4/1991 | Parsons et al. |
| 5,897,609 | A | 4/1999 | Choi et al. |
| 5,910,977 | A | 6/1999 | Torregrossa |
| 5,917,808 | A | 6/1999 | Koshbab |
| 6,088,582 | A | 7/2000 | Canora et al. |
| 6,308,496 | B1 | 10/2001 | Lee |
| 6,367,032 | B1 | 4/2002 | Kasahara |
| 6,662,135 | B1 | 12/2003 | Burns |
| 6,671,160 | B2 | 12/2003 | Hayden |
| 6,826,512 | B2 | 11/2004 | Dara-Abrams et al. |

(Continued)

FOREIGN PATENT DOCUMENTS

| | | |
|---|---|---|
| CN | 202261360 | 5/2012 |
| WO | 2001013604 | 2/2001 |

(Continued)

OTHER PUBLICATIONS

Feb. 28, 2019, Kumar, Samant; Notice of Allowance for U.S. Appl. No. 15/642,915, filed Jul. 6, 2017, dated Feb. 28, 2019, 11 pgs.

(Continued)

*Primary Examiner* — Afsar M Qureshi
(74) *Attorney, Agent, or Firm* — Taylor English Duma LLP

(57) ABSTRACT

A system for testing multiple wireless devices independently and simultaneously using different types of device probes is disclosed. The system includes real-time, bi-directional/asynchronous communication and interaction between system components.

19 Claims, 4 Drawing Sheets

(56) References Cited

U.S. PATENT DOCUMENTS

| | | | |
|---|---|---|---|
| 6,859,043 B2 | 2/2005 | Ewing | |
| 7,068,757 B1 | 6/2006 | Burnett | |
| 7,254,755 B2 | 8/2007 | De Obaldia et al. | |
| 7,664,317 B1 | 2/2010 | Sowerby | |
| 7,809,517 B1 | 10/2010 | Zuckerman | |
| 8,121,028 B1 | 2/2012 | Schlesener | |
| 8,209,732 B2 | 6/2012 | Le | |
| 8,229,344 B1 | 7/2012 | Petersen | |
| 8,324,909 B2 | 12/2012 | Oakes | |
| 8,418,000 B1 | 4/2013 | Salame | |
| 8,418,219 B1 | 4/2013 | Parsons | |
| 8,515,015 B2 | 8/2013 | Maffre | |
| 8,689,071 B1 | 4/2014 | Valakh | |
| 8,806,400 B1 | 8/2014 | Bhawmik | |
| 9,013,307 B2 | 4/2015 | Hussain | |
| 9,270,983 B1 | 2/2016 | Hare, Jr. | |
| 9,316,714 B2 | 4/2016 | Rada | |
| 9,319,908 B2 | 4/2016 | Nickel | |
| 9,372,228 B2 | 6/2016 | Nickel | |
| 9,402,601 B1 | 8/2016 | Berger | |
| 9,490,920 B2 | 11/2016 | Partee | |
| 9,491,454 B1 | 11/2016 | Kumar | |
| 9,571,211 B2 | 2/2017 | Partee | |
| 9,602,556 B1* | 3/2017 | Cham | H04L 65/40 |
| 9,609,063 B2 | 3/2017 | Zhu et al. | |
| 9,810,735 B2 | 11/2017 | Kumar et al. | |
| 9,838,295 B2 | 12/2017 | Kumar et al. | |
| 9,900,113 B2 | 2/2018 | Kumar et al. | |
| 9,900,116 B2 | 2/2018 | Kumar et al. | |
| 9,960,989 B2 | 5/2018 | Kumar et al. | |
| 9,992,084 B2 | 6/2018 | Kumar et al. | |
| 10,116,397 B2 | 10/2018 | Kumar et al. | |
| 10,122,611 B2 | 11/2018 | Kumar et al. | |
| 10,158,553 B2 | 12/2018 | Tiwari et al. | |
| 10,230,617 B2 | 3/2019 | Kumar et al. | |
| 10,277,497 B2 | 4/2019 | Tiwari et al. | |
| 10,291,959 B2 | 5/2019 | Kumar et al. | |
| 10,298,483 B2 | 5/2019 | Kumar et al. | |
| 10,320,651 B2 | 6/2019 | Kumar et al. | |
| 2002/0070725 A1 | 6/2002 | Hilliges | |
| 2002/0077786 A1 | 6/2002 | Vogel et al. | |
| 2003/0005380 A1 | 1/2003 | Nguyen | |
| 2003/0184035 A1 | 10/2003 | Yu | |
| 2003/0200303 A1 | 10/2003 | Chong | |
| 2004/0010584 A1 | 1/2004 | Peterson | |
| 2004/0016708 A1 | 1/2004 | Rafferty | |
| 2004/0160226 A1 | 8/2004 | Ewing | |
| 2004/0189281 A1 | 9/2004 | Le et al. | |
| 2004/0203726 A1 | 10/2004 | Wei | |
| 2005/0041642 A1 | 2/2005 | Robinson | |
| 2005/0053008 A1 | 3/2005 | Griesing | |
| 2005/0102488 A1 | 5/2005 | Bullis | |
| 2005/0193294 A1 | 9/2005 | Hildebrant | |
| 2005/0249196 A1 | 11/2005 | Ansari et al. | |
| 2005/0286466 A1 | 12/2005 | Tagg | |
| 2006/0015785 A1 | 1/2006 | Chun | |
| 2006/0271322 A1 | 11/2006 | Haggerty | |
| 2007/0097659 A1 | 5/2007 | Behrens | |
| 2007/0220380 A1 | 9/2007 | Ohanyan | |
| 2008/0026748 A1 | 1/2008 | Alexander et al. | |
| 2008/0117907 A1 | 5/2008 | Hein | |
| 2008/0144293 A1 | 6/2008 | Aksamit | |
| 2008/0159737 A1 | 7/2008 | Noble et al. | |
| 2008/0168520 A1 | 7/2008 | Vanderhoff | |
| 2008/0274712 A1 | 11/2008 | Rofougaran | |
| 2008/0315898 A1 | 12/2008 | Cannon | |
| 2009/0059933 A1 | 3/2009 | Huang | |
| 2009/0089854 A1 | 4/2009 | Le | |
| 2009/0213738 A1 | 8/2009 | Volpe et al. | |
| 2009/0254976 A1 | 10/2009 | Huotari et al. | |
| 2009/0282446 A1 | 11/2009 | Breed | |
| 2009/0282455 A1 | 11/2009 | Bell et al. | |
| 2009/0289020 A1 | 11/2009 | Wurmhoringer | |
| 2010/0132000 A1 | 5/2010 | Straub | |
| 2010/0138823 A1 | 6/2010 | Thornley | |
| 2010/0246416 A1 | 9/2010 | Sinha | |
| 2010/0281107 A1 | 11/2010 | Fallows et al. | |
| 2011/0001833 A1* | 1/2011 | Grinkemeyer | H04H 20/12 348/192 |
| 2011/0006794 A1 | 1/2011 | Sellathamby | |
| 2011/0012632 A1 | 1/2011 | Merrow | |
| 2011/0035676 A1* | 2/2011 | Tischer | H04M 1/677 715/745 |
| 2011/0072306 A1 | 3/2011 | Racey | |
| 2011/0090075 A1 | 4/2011 | Armitage et al. | |
| 2011/0099424 A1 | 4/2011 | Rivera Trevino | |
| 2011/0107074 A1 | 5/2011 | Chan et al. | |
| 2011/0116419 A1 | 5/2011 | Cholas | |
| 2011/0149720 A1 | 6/2011 | Phuah et al. | |
| 2011/0222549 A1 | 9/2011 | Connelly | |
| 2011/0267782 A1 | 11/2011 | Petrick | |
| 2011/0306306 A1 | 12/2011 | Reed | |
| 2012/0140081 A1 | 1/2012 | Clements | |
| 2012/0122406 A1 | 5/2012 | Gregg et al. | |
| 2012/0163227 A1* | 6/2012 | Kannan | H04L 41/5009 370/252 |
| 2012/0198084 A1 | 8/2012 | Keskitalo | |
| 2012/0198442 A1 | 8/2012 | Kashyap | |
| 2012/0213259 A1 | 8/2012 | Renken et al. | |
| 2012/0220240 A1 | 8/2012 | Rothschild | |
| 2012/0275784 A1 | 11/2012 | Soto | |
| 2012/0278826 A1 | 11/2012 | Jones | |
| 2012/0306895 A1* | 12/2012 | Faulkner | H04L 43/50 345/501 |
| 2013/0014983 A1 | 1/2013 | Korson et al. | |
| 2013/0033279 A1 | 2/2013 | Sozanski | |
| 2013/0049794 A1 | 2/2013 | Humphrey | |
| 2013/0076217 A1 | 3/2013 | Thompson | |
| 2013/0093447 A1 | 4/2013 | Nickel | |
| 2013/0104158 A1 | 4/2013 | Partee | |
| 2013/0152047 A1 | 6/2013 | Moorthi et al. | |
| 2013/0160064 A1 | 6/2013 | Van Rozen | |
| 2013/0167123 A1 | 6/2013 | Dura | |
| 2013/0257468 A1 | 10/2013 | Mlinarsky | |
| 2013/0305091 A1 | 11/2013 | Stan et al. | |
| 2014/0047322 A1 | 2/2014 | Kim | |
| 2014/0091874 A1 | 4/2014 | Cook et al. | |
| 2014/0115580 A1 | 4/2014 | Kellerman | |
| 2014/0123200 A1 | 5/2014 | Park | |
| 2014/0126387 A1 | 5/2014 | Gintis | |
| 2014/0156819 A1 | 6/2014 | Cavgalar | |
| 2014/0187172 A1 | 7/2014 | Partee | |
| 2014/0187173 A1* | 7/2014 | Partee | H04L 43/045 455/67.12 |
| 2014/0207404 A1 | 7/2014 | Fritzsche | |
| 2014/0256373 A1 | 9/2014 | Hernandez | |
| 2014/0266930 A1 | 9/2014 | Huynh | |
| 2014/0269386 A1 | 9/2014 | Chu | |
| 2014/0269871 A1 | 9/2014 | Huynh | |
| 2014/0282783 A1 | 9/2014 | Totten | |
| 2014/0370821 A1 | 12/2014 | Guterman | |
| 2015/0024720 A1 | 1/2015 | Efrati | |
| 2015/0093987 A1 | 4/2015 | Ouyang | |
| 2015/0109941 A1 | 4/2015 | Zhang | |
| 2015/0151669 A1 | 6/2015 | Meisner | |
| 2015/0180743 A1 | 6/2015 | Jana et al. | |
| 2015/0226716 A1 | 8/2015 | Nelson | |
| 2015/0237010 A1 | 8/2015 | Roskind | |
| 2015/0253357 A1 | 9/2015 | Olgaard | |
| 2015/0288589 A1 | 10/2015 | Radford et al. | |
| 2015/0369851 A1 | 12/2015 | Even | |
| 2016/0080241 A1 | 3/2016 | Rocha De Maria | |
| 2016/0102951 A1 | 4/2016 | Cole | |
| 2016/0191364 A1 | 6/2016 | Ajitomi | |
| 2016/0381818 A1 | 12/2016 | Mills | |
| 2017/0048519 A1 | 2/2017 | Friel | |
| 2017/0089981 A1 | 3/2017 | Kumar | |
| 2017/0093682 A1 | 3/2017 | Kumar | |
| 2017/0093683 A1 | 3/2017 | Kumar | |
| 2017/0126536 A1 | 5/2017 | Kumar | |
| 2017/0126537 A1 | 5/2017 | Kumar | |
| 2017/0126539 A1 | 5/2017 | Tiwari | |
| 2017/0149635 A1 | 5/2017 | Kumar | |
| 2017/0149645 A1 | 5/2017 | Kumar | |

(56) References Cited

U.S. PATENT DOCUMENTS

| | | | |
|---|---|---|---|
| 2017/0195071 A1 | 7/2017 | Kumar | |
| 2017/0250762 A1 | 8/2017 | Kumar et al. | |
| 2017/0288791 A1 | 10/2017 | Kumar et al. | |
| 2017/0288993 A1 | 10/2017 | Kumar et al. | |
| 2017/0289012 A1* | 10/2017 | Tiwari | H04L 12/2801 |
| 2017/0302994 A1 | 10/2017 | Kumar | |
| 2018/0024193 A1 | 1/2018 | Kumar et al. | |
| 2018/0076908 A1 | 3/2018 | Kumar et al. | |
| 2018/0077046 A1 | 3/2018 | Kumar et al. | |
| 2018/0351846 A1 | 12/2018 | Kumar et al. | |
| 2019/0182134 A1 | 6/2019 | Kumar et al. | |
| 2019/0190625 A1 | 6/2019 | Kumar et al. | |
| 2019/0260664 A1 | 8/2019 | Kumar et al. | |
| 2019/0273675 A1 | 9/2019 | Kumar et al. | |

FOREIGN PATENT DOCUMENTS

| | | |
|---|---|---|
| WO | 2013169728 | 11/2013 |
| WO | 2014035462 | 3/2014 |
| WO | 2014065843 | 5/2014 |
| WO | 2017053961 | 3/2017 |
| WO | 2017074872 | 5/2017 |

OTHER PUBLICATIONS

Feb. 26, 2019, Tiwari, Rajeev; Corrected Notice of Allowance for U.S. Appl. No. 15/348,920, filed Nov. 10, 2016, dated Feb. 26, 2019, 8 pgs.

Kumar, Samant; Issue Notification for U.S. Appl. No. 14/866,780, filed Sep. 25, 2015, dated Oct. 19, 2016, 1 pg.

Kumar, Samant; Notice of Allowance for U.S. Appl. No. 14/866,780, filed Sep. 25, 2015, dated Jul. 19, 2016, 8 pgs.

Kumar, Samant; Advisory Action for U.S. Appl. No. 15/642,915, filed Jul. 6, 2017, dated Jul. 23, 2018, 18 pgs.

Kumar, Samant; Final Office Action for U.S. Appl. No. 15/642,915, filed Jul. 6, 2017, dated Apr. 5, 2018, 18 pgs.

Kumar, Samant; Non-Final Office Action for U.S. Appl. No. 15/642,915, filed Jul. 6, 2017, dated Oct. 2, 2018, 15 pgs.

Kumar, Samant; Non-Final Office Action for U.S. Appl. No. 15/642,915, filed Jul. 6, 2017, dated Nov. 1, 2017, 42 pgs.

Kumar, Samant; Notice of Allowance for U.S. Appl. No. 15/642,915, filed Jul. 6, 2017, dated Feb. 28, 2019, 11 pgs.

Kumar, Samant; Issue Notification for U.S. Appl. No. 14/866,630, filed Sep. 25, 2015, dated Apr. 11, 2018, 1 pg.

Kumar, Samant; Non-Final Office Action for U.S. Appl. No. 14/866,630, filed Sep. 25, 2015, dated Aug. 9, 2017, 24 pgs.

Kumar, Samant; Notice of Allowance for U.S. Appl. No. 14/866,630, filed Sep. 25, 2015, dated Dec. 20, 2017, 19 pgs.

Kumar, Samant; Supplemental Notice of Allowance for U.S. Appl. No. 14/866,630, filed Sep. 25, 2015, dated Jan. 31, 2018, 9 pgs.

Kumar, Samant; Supplemental Notice of Allowance for U.S. Appl. No. 14/866,630, filed Sep. 25, 2015, dated Mar. 30, 2018, 6 pgs.

Kumar, Samant; Corrected Notice of Allowability for U.S. Appl. No. 14/866,752, filed Sep. 25, 2015, dated Jul. 10, 2018, 5 pgs.

Kumar, Samant; Corrected Notice of Allowance for U.S. Appl. No. 14/866,752, filed Sep. 25, 2015, dated Oct. 4, 2018, 5 pgs.

Kumar, Samant; Issue Notification for U.S. Appl. No. 14/866,752, filed Sep. 25, 2015, dated Oct. 17, 2018, 1 pg.

Kumar, Samant; Non-Final Office Action for U.S. Appl. No. 14/866,752, filed Sep. 25, 2015, dated Nov. 7, 2017, 26 pgs.

Kumar, Samant; Notice of Allowance for U.S. Appl. No. 14/866,752, filed Sep. 25, 2015, dated May 17, 2018, 16 pgs.

Kumar, Samant; Notice of Allowance for U.S. Appl. No. 16/103,546, filed Aug. 14, 2018, dated Jan. 28, 2019, 36 pgs.

Kumar, Samant; Certificate of Correction for U.S. Appl. No. 14/866,720, filed Sep. 25, 2015, dated Feb. 13, 2018, 1 pg.

Kumar, Samant; Issue Notification for U.S. Appl. No. 14/866,720, filed Sep. 25, 2015, dated Oct. 18, 2017, 1 pg.

Kumar, Samant; Non-Final Office Action for U.S. Appl. No. 14/866,720, filed Sep. 25, 2015, dated Jan. 23, 2017, 17 pgs.

Kumar, Samant; Notice of Allowance for U.S. Appl. No. 14/866,720, filed Sep. 25, 2015, dated Jun. 29, 2017, 26 pgs.

Kumar, Samant; Notice of Allowance for U.S. Appl. No. 14/866,720, filed Sep. 25, 2015, dated Aug. 28, 2017, 11 pgs.

Kumar, Samant; Response to Rule 312 Communication for U.S. Appl. No. 14/866,720, filed Sep. 25, 2015, dated Jul. 26, 2017, 2 pgs.

Kumar, Samant; Non-Final Office Action for U.S. Appl. No. 15/722,235, filed Oct. 2, 2017, dated Jan. 8, 2019, 62 pgs.

Kumar, Samant; Ex-Parte Quayle Office Action for U.S. Appl. No. 14/948,925, filed Nov. 23, 2015, dated Jun. 20, 2017, 29 pgs.

Kumar, Samant; Issue Notification for U.S. Appl. No. 14/948,925, filed Nov. 23, 2015, dated Nov. 16, 2017, 1 pg.

Kumar, Samant; Notice of Allowance for U.S. Appl. No. 14/948,925, filed Nov. 23, 2015, dated Sep. 20, 2017, 15 pgs.

Kumar, Samant; Supplemental Notice of Allowance for U.S. Appl. No. 14/948,925, filed Nov. 23, 2015, dated Oct. 5, 2017, 2 pgs.

Kumar, Samant; Corrected Notice of Allowance for U.S. Appl. No. 15/813,838, filed Nov. 15, 2017, dated Feb. 12, 2019, 6 pgs.

Kumar, Samant; Issue Notification for U.S. Appl. No. 15/813,838, filed Nov. 15, 2017, dated Jan. 9, 2019, 1 pg.

Kumar, Samant; Issue Notification for U.S. Appl. No. 15/813,838, filed Nov. 15, 2017, dated Feb. 20, 2019, 1 pg.

Kumar, Samant; Notice of Allowance for U.S. Appl. No. 15/813,838, filed Nov. 15, 2017, dated Oct. 2, 2018, 52 pgs.

Kumar, Samant; Issue Notification for U.S. Appl. No. 14/948,143, filed Nov. 20, 2015, dated May 16, 2018, 1 pg.

Kumar, Samant; Non-Final Office Action for U.S. Appl. No. 14/948,143, filed Nov. 20, 2015, dated Dec. 28, 2017, 39 pgs.

Kumar, Samant; Notice of Allowance for U.S. Appl. No. 14/948,143, filed Nov. 20, 2015, dated Jan. 25, 2018, 13 pgs.

Kumar, Samant; Supplemental Notice of Allowance for U.S. Appl. No. 14/948,143, filed Nov. 20, 2015, dated May 7, 2018, 7 pgs.

Kumar, Samant; Final Office Action for U.S. Appl. No. 15/624,950, filed Jun. 16, 2017, dated Dec. 20, 2018, 33 pgs.

Kumar, Samant; Non-Final Office Action for U.S. Appl. No. 15/624,950, filed Jun. 16, 2017, dated Jul. 9, 2018, 50 pgs.

Kumar, Samant; Corrected Notice of Allowance for U.S. Appl. No. 14/987,538, filed Jan. 4, 2016, dated Jan. 10, 2018, 8 pgs.

Kumar, Samant; Issue Notification for U.S. Appl. No. 14/987,538, filed Jan. 4, 2016, dated Jan. 31, 2018, 1 pg.

Kumar, Samant; Non-Final Office Action for U.S. Appl. No. 14/987,538, filed Jan. 4, 2016, dated Jul. 21, 2017, 18 pgs.

Kumar, Samant; Notice of Allowance for U.S. Appl. No. 14/987,538, filed Jan. 4, 2016, dated Dec. 4, 2017, 20 pgs.

Kumar, Samant; Notice of Allowance for U.S. Appl. No. 14/987,538, filed Jan. 4, 2016, dated Mar. 23, 2017, 7 pgs.

Kumar, Samant; Response to Amendment under Rule 312 for U.S. Appl. No. 14/987,538, filed Jan. 4, 2016, dated Jan. 17, 2018, 2 pgs.

Kumar, Samant; Corrected Notice of Allowance for U.S. Appl. No. 15/624,961, filed Jun. 16, 2017, dated Jun. 28, 2018, 7 pgs.

Kumar, Samant; Corrected Notice of Allowance for U.S. Appl. No. 15/624,961, filed Jun. 16, 2017, dated Sep. 28, 2018, 9 pgs.

Kumar, Samant; Issue Notification for U.S. Appl. No. 15/624,961, filed Jun. 16, 2017, dated Oct. 10, 2018, 1 pg.

Kumar, Samant; Non-Final Office Action for U.S. Appl. No. 15/624,961, filed Jun. 16, 2017, dated Jul. 19, 2017, 7 pgs.

Kumar, Samant; Notice of Allowance for U.S. Appl. No. 15/624,961, filed Jun. 16, 2017, dated May 22, 2018, 44 pgs.

Consumer Electronics Net; Article entitled: "Teleplan Enhances Test Solution Portfolio with Titan", located at <http://www.consumerelectronicsnet.com/article/Teleplan-Enhances-Test-Solution-Portfolio-With-Titan-4673561>, published on Nov. 1, 2016, 3 pgs.

Promptlink; Article entitled: "Set-Top Box Test Platform", located at <http://promptlink.com/products/stbtp.html>, earliest known publication date Aug. 11, 2016, 7 pgs.

Exact Ventures; Report entitled: North American Telecommunications Equipment Repair Market, located at http://www.fortsol.com/wp-content/uploads/2016/08/Exact-Ventures-NA-Repair-Market-Report.pdf>, earliest known publication date Aug. 1, 2016, 12 pgs.

Promptlink; Article entitled: "Cable Modem Test Platform", located at <https://www.promptlink.com/products/cmtp.html>, earliest known publication date Aug. 11, 2016, 10 pgs.

(56) References Cited

OTHER PUBLICATIONS

Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.
CED Magazine; Article entitled: "Cable Connects in Atlanta", located at <https://www.cedmagazine.com/article/2006/04/cable-connects-atlanta>, Apr. 30, 2006, 21 pgs.
Teleplan; Article entitled: "Screening & Testing", located at <https://www.teleplan.com/innovative-services/screening-testing/>, earliest known publication date Mar. 21, 2015, 7 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
S3 Group; Document entitled: "White Paper: The Importance of Automated Testing in Set-Top Box Integration", earliest known publication date Jun. 17, 2014, 11 pgs.
Tvtechnology; Article entitled: "S3 Group's StormTest", located at <http://www.tvtechnology.com/expertise/0003/s3-groups-stormtest/256690>, published May 1, 2012, 2 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
Kumar, Samant; Notice of Non-Compliant Amendment for U.S. Appl. No. 15/624,961, filed Jun. 16, 2017, dated Jan. 10, 2018, 5 pgs.
Kumar, Samant; Non-Final Office Action for U.S. Appl. No. 14/929,180, filed Oct. 30, 2015, dated Oct. 1, 2018, 15 pgs.
Kumar, Samant; Advisory Action for U.S. Appl. No. 14/929,180, filed Oct. 30, 2015, dated Jul. 27, 2018, 9 pgs.
Kumar, Samant; Final Office Action for U.S. Appl. No. 14/929,180, filed Oct. 30, 2015, dated May 8, 2018, 35 pgs.
Kumar, Samant; Non-Final Office Action for U.S. Appl. No. 14/929,180, filed Oct. 30, 2015, dated Aug. 22, 2017, 32 pgs.
Kumar, Samant; Notice of Allowance for U.S. Appl. No. 14/929,220, filed Oct. 30, 2015, dated Feb. 19, 2019, 24 pgs.
Kumar, Samant; Non-Final Office Action for U.S. Appl. No. 14/929,220, filed Oct. 30, 2015, dated Oct. 1, 2018, 13 pgs.
Kumar, Samant; Advisory Action for U.S. Appl. No. 14/929,220, filed Oct. 30, 2015, dated Jul. 27, 2018, 8 pgs.
Kumar, Samant; Final Office Action for U.S. Appl. No. 14/929,220, filed Oct. 30, 2015, dated May 10, 2018, 38 pgs.
Kumar, Samant; Non-Final Office Action for U.S. Appl. No. 14/929,220, filed Oct. 30, 2015, dated Aug. 24, 2017, 31 pgs.
Kumar, Samant; Issue Notification for U.S. Appl. No. 15/057,085, filed Feb. 29, 2016, dated Jan. 31, 2018.
Kumar, Samant; Corrected Notice of Allowance for U.S. Appl. No. 15/057,085, filed Feb. 29, 2016, dated Oct. 31, 2017, 6 pgs.
Kumar, Samant; Notice of Allowance for U.S. Appl. No. 15/057,085, filed Feb. 29, 2016, dated Sep. 29, 2017, 28 pgs.
Kumar, Samant; Non-Final Office Action for U.S. Appl. No. 15/057,085, filed Feb. 29, 2016, dated Apr. 7, 2017, 15 pgs.
Kumar, Samant; Advisory Action for U.S. Appl. No. 15/818,803, filed Nov. 21, 2017, dated Feb. 5, 2019, 13 pgs.
Kumar, Samant; Final Office Action for U.S. Appl. No. 15/818,803, filed Nov. 21, 2017, dated Nov. 26, 2018, 20 pgs.
Kumar, Samant; Non-Final Office Action for U.S. Appl. No. 15/818,803, filed Nov. 21, 2017, dated Jul. 25, 2018, 46 pgs.

Tiwari, Rajeev; Corrected Notice of Allowance for U.S. Appl. No. 15/348,920, filed Nov. 10, 2016, dated Feb. 26, 2019, 8 pgs.
Tiwari, Rajeev; Notice of Allowance for U.S. Appl. No. 15/348,920, filed Nov. 10, 2016, dated Dec. 4, 2018, 11 pgs.
Tiwari, Rajeev; Non-Final Office Action for U.S. Appl. No. 15/348,920, filed Nov. 10, 2016, dated Aug. 24, 2018, 10 pgs.
Tiwari, Rajeev; Advisory Action for U.S. Appl. No. 15/348,920, filed Nov. 10, 2016, dated Jul. 17, 2018, 8 pgs.
Tiwari, Rajeev; Final Office Action for U.S. Appl. No. 15/348,920, filed Nov. 10, 2016, dated Apr. 30, 2018, 34 pgs.
Tiwari, Rajeev; Non-Final Office Action for U.S. Appl. No. 15/348,920, filed Nov. 10, 2016, dated Nov. 20, 2017, 53 pgs.
Nordman, Bruce, "Testing Products with Network Connectivity," Jun. 21, 2011 [retrieved online at http://citeseerx.is1.psu.edu/viewdoc/download?doi=10.1.1.695.772&rep=rep1&type=pdf on Feb. 6, 2017], 20 pgs.
Tiwari, Rajeev; Issue Notification for U.S. Appl. No. 15/624,967, filed Jun. 16, 2017, dated Nov. 29, 2018, 1 pg.
Tiwari, Rajeev; Supplemental Notice of Allowance for U.S. Appl. No. 15/624,967, filed Jun. 16, 2017, dated Sep. 19, 2018, 7 pgs.
Tiwari, Rajeev; Notice of Allowance for U.S. Appl. No. 15/624,967, filed Jun. 16, 2017, dated Aug. 28, 2018, 6 pgs.
Tiwari, Rajeev; Advisory Action for U.S. Appl. No. 15/624,967, filed Jun. 16, 2017, dated Jul. 17, 2018, 7 pgs.
Tiwari, Rajeev; Final Office Action for U.S. Appl. No. 15/624,967, filed Jun. 16, 2017, dated May 8, 2018, 40 pgs.
Tiwari, Rajeev; Non-Final Office Action for U.S. Appl. No. 15/624,967, filed Jun. 16, 2017, dated Nov. 7, 2017, 52 pgs.
Kumar, Samant; International Preliminary Report on Patentability for PCT Application No. PCT/US2016/053768, Sep. 26, 2016, dated Apr. 5, 2018, 13 pgs.
Kumar, Samant; International Search Report and Written Opinion for PCT/US16/53768, filed Sep. 26, 2016, dated Feb. 3, 2017, 17 pgs.
Kumar, Samant; International Preliminary Report on Patentability for PCT Application No. PCT/US2016/058507, filed Oct. 24, 2016, dated May 11, 2018, 12 pgs.
Kumar, Samant; International Search Report and Written Opinion for PCT/US2016/058507, filed Oct. 24, 2016, dated Jan. 3, 2017, 12 pgs.
Kumar, Samant; Corrected Notice of Allowance for U.S. Appl. No. 15/642,915, filed Jul. 6, 2017, dated Apr. 10, 2019, 7 pgs.
Kumar, Samant; Issue Notification for U.S. Appl. No. 15/642,915, filed Jul. 6, 2017, dated Apr. 24, 2019, 1 pg.
Kumar, Samant; Supplemental Notice of Allowance for U.S. Appl. No. 15/642,915, filed Jul. 6, 2017, dated Mar. 25, 2019, 8 pgs.
Kumar, Samant; Corrected Notice of Allowance for U.S. Appl. No. 16/103,546, filed Mar. 25, 2019, dated Mar. 25, 2019, 7 pgs.
Kumar, Samant; Corrected Notice of Allowance for U.S. Appl. No. 16/103,546, filed Aug. 14, 2018, dated Apr. 9, 2019, 6 pgs.
Kumar, Samant; Supplemental Notice of Allowance for U.S. Appl. No. 14/929,220, filed Oct. 30, 2015, dated Apr. 12, 2019, 7 pgs.
Kumar, Samant; Supplemental Notice of Allowance for U.S. Appl. No. 14/929,220, filed Oct. 30, 2015, dated May 6, 2019, 7 pgs.
Tiwari, Rajeev; Corrected Notice of Allowance for U.S. Appl. No. 15/348,920, filed Nov. 10, 2016, dated Mar. 27, 2019, 13 pgs.
Tiwari, Rajeev; Issue Notification for U.S. Appl. No. 15/348,920, filed Nov. 10, 2016, dated Apr. 10, 2019, 1 pg.
Kumar, Samant; Final Office Action for U.S. Appl. No. 15/722,235, filed Oct. 2, 2017, dated Jul. 2, 2019, 18 pgs.
Kumar, Samant; Non-Final Office Action for U.S. Appl. No. 16/278,534, filed Feb. 18, 2019, dated Jun. 11, 2019, 25 pgs.
Kumar, Samant; Final Office Action for U.S. Appl. No. 16/283,340, filed Feb. 22, 2019, dated Aug. 13, 2019, 19 pgs.
Kumar, Samant; Non-Final Office Action for U.S. Appl. No. 16/283,340, filed Feb. 22, 2019, dated Jun. 12, 2019, 51 pgs.
Kumar, Samant; Advisory Action for U.S. Appl. No. 15/722,235, filed Oct. 2, 2017, dated Sep. 18, 2019, 4 pgs.
Kumar, Samant; Notice of Allowance for U.S. Appl. No. 15/722,235, filed Oct. 2, 2017, dated Oct. 16, 2019, 17 pgs.
Kumar, Samant; Non-Final Office Action for U.S. Appl. No. 16/400,512, filed May 1, 2019, dated Aug. 22, 2019, 48 pgs.

(56) References Cited

OTHER PUBLICATIONS

Kumar, Samant; Notice of Allowance for U.S. Appl. No. 16/400,512, filed May 1, 2019, dated Nov. 4, 2019, 16 pgs.
Kumar, Samant; Supplemental Notice of Allowance for U.S. Appl. No. 15/722,235, filed Oct. 2, 2017, dated Dec. 4, 2019, 6 pgs.
Kumar, Samant; Final Office Action for U.S. Appl. No. 16/278,534, filed Feb. 18, 2019, dated Jan. 7, 2020, 34 pgs.
Kumar, Samant; Supplemental Notice of Allowance for U.S. Appl. No. 16/400,512, filed May 1, 2019, dated Jan. 13, 2020, 6 pgs.

* cited by examiner

WIRELESS DEVICES UNDER TEST

CROSS REFERENCE

This application is a continuation of U.S. patent application Ser. No. 15/813,838, filed Nov. 15, 2017, now U.S. Pat. No. 10,230,617, issued Mar. 12, 2019, which is a continuation of U.S. patent application Ser. No. 14/948,925, filed Nov. 23, 2015, now U.S. Pat. No. 9,838,295, issued Dec. 5, 2017, both of which are hereby incorporated by reference in their entirety.

This application is also related to U.S. patent application Ser. No. 14/866,720 filed Sep. 25, 2015 now U.S. Pat. No. 9,810,735, issued Nov. 7, 2017, and to U.S. patent application Ser. No. 14/866,752 filed Sep. 25, 2015 now U.S. Pat. No. 10,122,611, issued Nov. 6, 2018, and to U.S. patent application Ser. No. 14/866,630 Sep. 25, 2015 now U.S. Pat. No. 9,960,989, issued May 1, 2018, and to U.S. patent application Ser. No. 14/866,780 Sep. 25, 2015 now U.S. Pat. No. 9,491,454, issued Nov. 8, 2016, and to U.S. patent application Ser. No. 14/948,143 filed Nov. 20, 2015 now U.S. Pat. No. 9,992,084, issued Jun. 5, 2018, and to U.S. patent application Ser. No. 14/929,180 filed Oct. 30, 2015, and to U.S. patent application Ser. No. 14/929,220 filed Oct. 30, 2015, each of which are hereby incorporated by reference in their entirety.

TECHNICAL FIELD

The present invention is directed to a system for testing devices.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, an innovative system can test a set of devices simultaneously. Further, such a testing system is capable of testing disparate devices simultaneously.

According to certain embodiments, such a testing system provides a separate set of interfaces for each device that is under testing of the set of devices. Further, such a system is designed to be adaptive by being extendable for testing new devices with corresponding new testing interfaces without fundamentally changing the core architecture of the testing system. As a non-limiting example, the testing system includes a core testing subsystem with a user interface and asynchronous communication among the system components such that new types of devices and new tests can be added and executed in a seamless fashion.

According to certain embodiments, the user interface can communicate through web sockets with a universal tester. Such communication is in real-time, bi-directional and asynchronous so that the user can control and monitor the testing of multiple devices simultaneously and independently of each other using the same universal tester and associated test bench.

According to certain embodiments, the testing system is capable of testing a set of similar types of devices or a set of disparate devices.

Figure 1:
FIG. 1 illustrates a high-level system architecture for testing devices, according to certain embodiments.

According to certain embodiments, a testing solution system can be a three layer implementation. The number of layers may vary from implementation to implementation. FIG. 1 illustrates a high-level system architecture for testing devices, according to certain embodiments. FIG. 1 shows a test bench browser interface 102 that is in communication with a web-socket 104, that is, in turn, in communication with a core testing processor 106. According to certain embodiments, the communication between the test bench browser 102, web-socket 104 and core testing processor 106 can be a TCP/IP communication. As a non-limiting example, the web browser is used as a user interface that communicates through web-sockets with the core testing processor. As a non-limiting example, communication may be in the form of JSON messages using TCP/IP protocol, according to certain embodiments. JSON is Java script object notation for transmitting data between the server and web applications.

Figure 2:
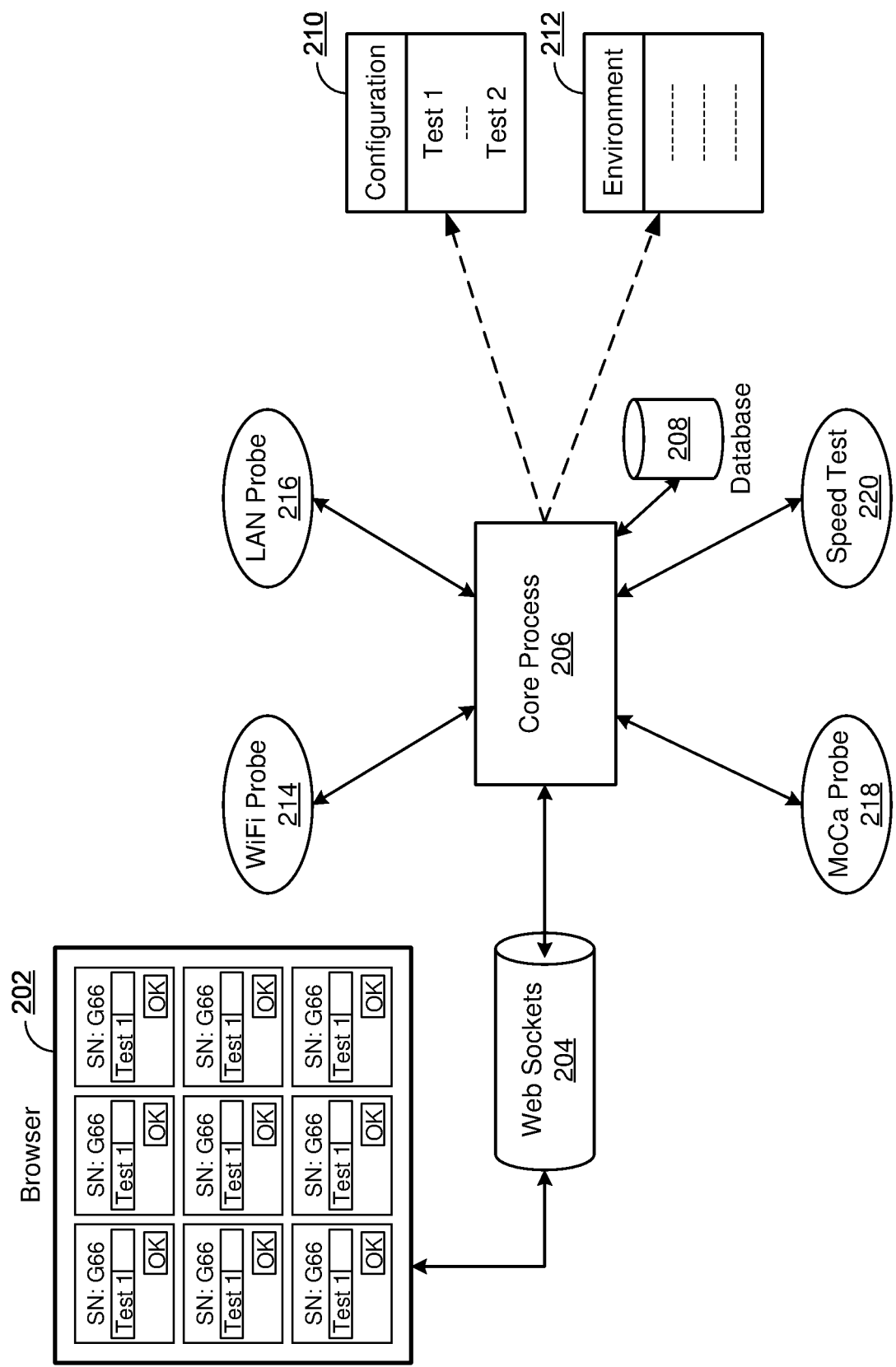
FIG. 2 illustrates some of the testing components and the interaction between the testing components, according to certain embodiments.

FIG. 2 illustrates some of the testing components and the interaction between the testing components, according to certain embodiments. FIG. 2 shows a user interface 202, web-sockets 204, a core testing processor 206, database 208, test configuration modules 210, testing environment modules 212, a plurality of probes (214, 216, 218) to connect the devices under test (DUT) to the core testing processor 206, and a speed test module 220, according to certain embodiments. Speed testing is used for evaluating the performance of the WiFi and other media network connection and accessibility of the device under test. FIG. 2 shows as non-limiting examples, a WFi probe 214, an Ethernet local area network (LAN) probe 216 and a MOCA probe 218. In other words, according to certain embodiments, various probes can be included such as a wireless local area network (WLAN) probe, an Ethernet wide area network (WAN) probe, a multimedia over coax alliance (MoCA) WAN probe, a MoCA LAN probe and a wireless probe via antenna. According to certain embodiments, servers and other components in the testing system may be distributed over a plurality of computers.

According to certain embodiments, core testing processor 206 loads and reads files from test configuration modules 210 and test environment modules 212 to initialize various components of the testing system. When the system is ready to begin testing after the initialization process, the system notifies a user that is using the testing system to test one or more devices (DUTs) of the readiness of the testing system. The user installs each device or DUT (of the set of DUTs that are to be tested) in a separate Faraday cage (slot) in the test bench and the serial number of each DUT is scanned. According to certain embodiments, there are several Faraday cages (slots) in a given test bench so that a plurality of DUTs can be tested simultaneously using the same test bench and same universal tester. The core testing processor 206 receives the serial number information of each DUT and using the serial number, retrieves further information associated with each DUT based on the serial number from database 208, according to certain embodiments. The core testing processor 206 dynamically loads test configuration information 210 and test environment information 212 based on device information such as make, model etc of a given DUT. After the test configuration and test environment information are loaded, the core testing processor 206 begins executing the various tests corresponding to each DUT so that the set of DUTs can be tested simultaneously. Each test may correspond to underlying testing modules associated with WFi, LAN, WAN or MoCA etc, interfaces of the DUT and such modules can be executed locally, remotely or at the device.

According to certain embodiments, the test configuration information identifies the test modules and corresponding testing scripts that are to be executed by the core testing processor 206 at run time. The core testing processor 206 also provides the test results and other feedback information to the user via the browser user interface 202 and web sockets 204. Further, the user can send user input and requests to the system through the browser user interface 202 and web sockets 204.

According to certain embodiments, core testing processor 206 determines the success or failure of a given test based on the test configuration parameters and output results of the testing. Further, upon failure of a given test, core testing processor 206 may continue further testing or halt test execution based on test configuration parameters, according to certain embodiments.

Upon completion of the relevant tests, a success message can be sent to the user via the browser user interface 202 and web sockets 204. Even though the DUTs in the set of DUTs are tested simultaneously, the user does not have to wait until all the testing of the DUTs in the set have been completed to begin installing other devices that need testing. Further, the testing of the devices need not be started at the same time. Soon after the testing is completed for a given DUT, the tested DUT may be uninstalled from its slot (Faraday cage) in the test bench and a new DUT can be installed in its slot so that testing can begin for the newly installed device.

According to certain embodiments, the test results can be stored locally and/or pushed to the cloud so that the results can be viewed remotely from any location. Further, the test results can be aggregated. According to certain embodiments, aggregated data includes data combined from several data measurements. Summary reports can be generated from such aggregated data. Non-limiting examples of summary reports include charts and graphs that display information on all the DUTs or at least a subset of the DUTs. Thus, the summary reports generated from the aggregated data can provide an overview of the testing information and characteristics of the DUTs. The aggregated data can reveal trends and other related information associated with the DUTs. Further, the aggregated data can include user-level data, access account activity, etc. According to certain embodiments, the testing system includes a billing system to charge for the testing services for each device.

Figure 3:
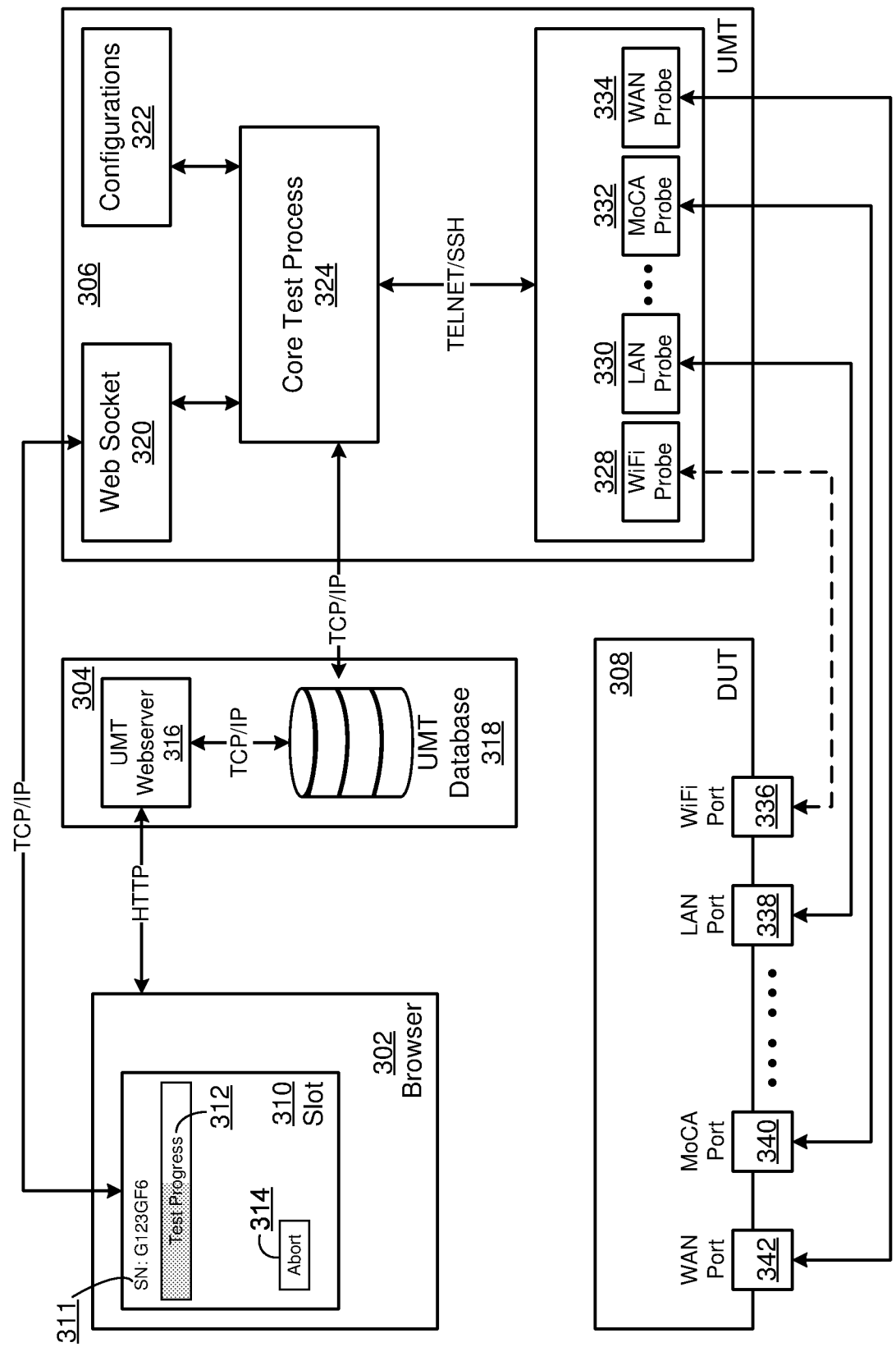
FIG. 3 illustrates a sample architecture that includes the testing components, according to certain embodiments.

FIG. 3 illustrates a sample architecture that includes the testing components of a universal tester, according to certain embodiments. FIG. 3 shows a browser user interface or operator dashboard 302, a test controller 304, a universal tester 306 and a device under test (DUT) 308. There may be multiple devices under testing simultaneously but only one device under test is shown for convenience in FIG. 3.

According to certain embodiments, browser user interface or operator dashboard 302 may include information 310 associated with each device under test. The information 310 can include DUT serial number 311, and testing progress information 312. Browser user interface or operator dashboard 302 may also include user command function buttons 314 and drop down menus (not shown in FIG. 3). According to certain embodiments, the user can configure slot details (e.g., port numbers, IP address for the slot, etc), configure testing preferences such as push to cloud, export to billing, etc.

According to certain embodiments, test controller 304 may include a universal tester webserver 316 that is in communication (e.g., TCP/IP) with a universal tester database 318. A billing process within the controller (not shown in FIG. 3) may be in communication with a billing service or application (not shown in FIG. 3). As a non-limiting example, database 318 can be a SQL database. Database 318 can store information associated with each slot in the test bench. As non-limiting examples, database 318 can store for each slot, test details, test history, test logs, DUT information (e.g., DUT serial number, model name, etc), testing preferences/configuration, user interface details/preferences/configuration, billing information, cloud push information, MSO/customer information (media subscriber organization), OEM (original equipment manufacturer) information, slot information, user information, and any persistent data needed by the universal device testing system for running tests.

According to certain embodiments, universal tester 306 may include web sockets 320 that are in communication (e.g., TCP/IP) with browser user interface or operator dashboard 302 and core testing processor 324. According to certain embodiments, core testing processor 324 is in communication with test controller 304 (e.g., TCP/IP) and in communication (e.g., Telnet/SSH secure shell) with probes/containers (328, 330, . . . , 332, 334). Core testing processor 324 is also in communication with configuration modules 322 (e.g., testing and environment configuration). Non-limiting examples of probes include WFi probe 328, LAN probe 330, MoCA probe 332 and WAN probe 334. There may be other types of probes including MoCA WAN probe, MoCA LAN probe and different types of wireless probes besides WiFi probes depending on the characteristics of the device being tested.

According to certain embodiments, WiFi probe 328, LAN probe 330, MoCA probe 332 and WAN probe 334 communicate with the respective device under test through the relevant ports on the device such as WiFi port 336, LAN port 338, MoCA port 340 and WAN port 342. Core testing processor 324 executes the relevant configured tests for the respective DUT. Status and test results can be sent to the user's dashboard (using JSON format messages as a non-limiting example) via the web-sockets.

Non-limiting examples of devices under test (DUTs) include set top boxes, cable modems, embedded multimedia terminal adapters, and wireless routers including broadband wireless routers for the home or for commercial networks.

Figure 4:
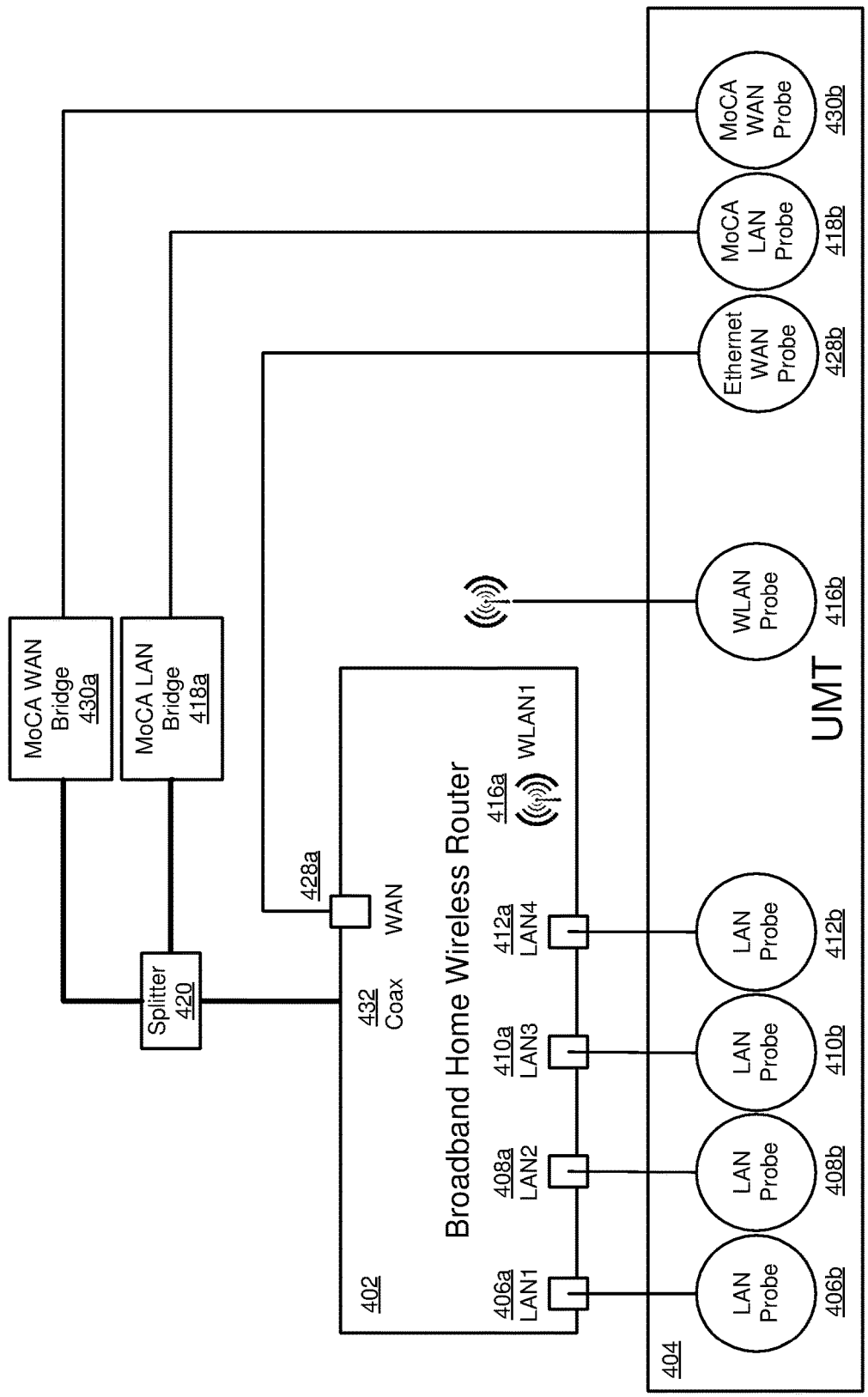
FIG. 4 illustrates a wireless router under test, according to certain embodiments.

FIG. 4 illustrates a testing architecture 400 for a wireless router under test, according to certain embodiments. As previously explained, multiple similar or disparate devices can be tested simultaneously and independently of each other using the same universal tester. Thus, multiple wireless routers can be tested simultaneously and independently of each other using the same universal tester, along with other types of devices using the same universal tester. For purposes of simplicity only one wireless router is shown in FIG. 4. FIG. 4 shows a universal tester 404 and a wireless router 402, which is the device under test for this specific case. Non-limiting examples of wireless routers include broadband wireless routers for the home or for commercial networks. Universal tester 404 includes a plurality of virtualization containers (probes) for communicating with corresponding interfaces of wireless router 402. For example, the core testing processor of the universal tester (as described herein) uses the LAN probes/containers 406b, 408b, 410b, 412b to test corresponding LAN interfaces 406a, 408a, 410a, 412a of wireless router 402. WLAN (wireless LAN) probe/container 416b can be used to test WLAN interface 416a of wireless router 402. Ethernet WAN probe/container 428b can be used to test WAN interface 428a of wireless router 402. MoCA LAN probe/container 418b can be used to test Coax interface 432 of wireless router 402 via MoCA LAN bridge 418a and splitter 420. MoCA WAN probe/container 430b can be used to test Coax interface 432 of wireless router 402 via MoCA WAN bridge 430a and splitter 420. The associated core testing processor executes the relevant configured tests for the wireless router 402. Status and test results can be sent to the user's dashboard (using JSON format messages as a non-limiting example) via the web-sockets.

According to certain embodiments, when executing a specific test for a given DUT, the core testing processor loads and reads test configuration information (for example from an XML structure) and identifies the relevant test script that needs to be executed. Inputs that are needed for executing the relevant test script are retrieved and supplied as inputs to the relevant test script. The following is a non-limiting sample test procedure.

Create DUT object & Environment Object
Verify Serial Number
Verify Warranty
Check Report Server
Check DUT Staging
   Checks for DUT Serial number in Database or Webservice
Get DUT Readiness Information
   Checks Web-service for test readiness status of DUT in the test process
Configure Container Environment
Clear Environment Temp Files
Analyze DUT for Factory Reset
   Checks ability to login to DUT
   Asks operator to manually Factory Reset if unable to login
Confirm Factory Reset (if needed)
   Waits for operator to confirm that DUT was factory reset and booted up properly
Check Ethernet LAN connections to DUT
   Ping connections: Eth LAN 1, 2, 3, 4
   Fails if any ping to these connections fail
Detect DUT
   Checks connection to DUT through socket connection
Reset Password
   Operator scans password which is stored temporarily for use in the remainder of test until finished
Login to GUI
   Done through web-scraping
Get DUT Information and compare values
   Information retrieved through web-scraping
Enable Telnet
   Enables telnet on DUT through web-scraping
Factory Reset
   Factory resets DUT through telnet command
Enable Telnet after Factory Reset
   Enables telnet on DUT through web-scraping
Confirm Power, WAN Ethernet, and Internet LEDs
Confirm all LAN Ethernet LEDs
Confirm WiFi LED
Configure Wireless Network
   Through telnet commands
   Sets N Mode
   Enables Privacy
   Sets WPA (Wi-Fi Protected Access)
   Removes WEP (Wired Equivalent Privacy)
   Assigns WiFi Channel to DUT (channel different by slot)
   [Channel 1: slots 1, 4, 7, 10, 13, 16]
   [Channel 6: slots 2, 5, 8, 11, 14]
   [Channel 11: slots 3, 6, 9, 12, 15]
   Verifies changes through GUI
   Disables WiFi once done through telnet
Check Firmware Version and Upgrade Firmware (if needed)
   Firmware version varies by models
Cage Closed Confirmation Check
   Asks Operator to Close Door on Cage
Connect Wireless Card
   Waits on shared Resource Server (located on TC) for Resource L2 (Layer 2)
Lock
   Lock waiting timeout: 600 sec
   All L2 Locks are able to run in parallel but not when any L3 (Layer 3)
Lock is running
   Obtains Lock
   Enables WiFi through telnet
   Set WiFi Card
   Total Retries allowed: 6 (2 sets of 3 retries)
   Ping WiFi from DUT
   L2 ARP Test on WiFi: must receive 10/10 ARP packets
   Total Retries allowed: 6 (2 sets of 3 retries)
   If either Set WiFi Card or L2 ARP Test Fail after its 3 retries, Ask Operator to Check Antennas
   Performs one more retry in full (set of 3 retries each for Set WiFi Card and L2 ARP WiFi Test) after Check Antennas
   Disables WiFi through telnet
   Releases Lock
Wireless to LAN Ethernet Speed Test
   Waits on shared Resource Server (located on TC) for Resource L3 Lock
   Lock waiting timeout: 1800 sec
   L3 Locks must be run one at a time and when no L2 Lock is running
   Obtains Lock
   Enables WiFi through telnet
   Connects WiFi Card Iperf3 Speed Test, 5 seconds for UDP Speed Test, 7 seconds for TCP Speed Test, Sending 200 Mbps Bandwidth
    Bandwidth must be greater than 60 Mbps on TCP (Reverse) or 70 Mbps on UDP (Forward)
      If Fail after 2 retries, ask operator to Check Antennas
      Retries up to 2 times more if still Fail
      Therefore, Total Retries allowed: 4 (2 sets of 2 retries)
      Runs sudo iwlist wlan0 scan and returns all Wireless Signals seen
        Results parsed to print all visible SSIDs and its matching Signal level
        Disables WiFi through telnet
        Releases Lock
Check wireless signal strength
    Confirm if signal strength for each antenna is greater than threshold (e.g., −50 dB)
Confirm WPS LED
Confirm LAN Coax LED
Confirm USB 1+2 LEDs
Configure WAN MoCA
Confirm WAN Coax LED
Ping WAN MoCA
Verify WPS trigger
    Confirm if WPS state toggles on the DUT after instruction
L2 Test on LAN Ethernet
    Arp Test from Eth LAN 1 to Eth LAN 2, 3, 4
    Must receive 10/10 on all LAN connections
LAN Ethernet to LAN Ethernet Speed Test
    From Eth LAN 1 to Eth LAN 2, 3, 4
    Iperf3 Speed Test, 5 seconds Reverse and Forward, (e.g., Sending 1200 Mbps Bandwidth)
    Bandwidth must be greater than threshold (e.g., 700 Mbps)
    Total Retries allowed: 2
Check WAN and LAN MoCA Data Rates
    Rx and Tx Data rates for both WAN and LAN MoCA retrieved through telnet
    All Rates must be greater than threshold (e.g., 180 Mbps)
LAN Ethernet to WAN MoCA FTP Speed Test
    From Eth LAN 1 to WAN MoCA
    Iperf3 Speed Test, 5 seconds Reverse and Forward (e.g., Sending 1200 Mbps Bandwidth)
    Bandwidth must be greater than threshold (e.g., 60 Mbps)
    Total Retries allowed: 2
LAN MoCA to LAN Ethernet FTP Speed Test
    From Eth LAN 1 to LAN MoCA
    Iperf3 Speed Test, 5 seconds Reverse and Forward, (e.g., Sending 240 Mbps Bandwidth)
    Bandwidth must be greater than threshold (e.g., 60 Mbps)
    Total Retries allowed: 2
LAN MoCA to WAN MoCA FTP Speed Test
    From LAN MoCA to WAN MoCA
    Iperf3 Speed Test, 5 seconds Reverse and Forward, (e.g., Sending 240 Mbps Bandwidth)
    Bandwidth must be greater than threshold (e.g., 60 Mbps)
    Total Retries allowed: 2
Enable WAN Ethernet
    Through telnet command
LAN Ethernet to WAN Ethernet FTP Speed Test
    From Eth LAN 1 to Eth WAN
    Iperf3 Speed Test, 5 seconds Reverse and Forward, (e.g., Sending 1200 Mbps Bandwidth)
    Bandwidth must be greater than threshold (e.g., 700 Mbps)
    Total Retries allowed: 2
Clear Persistent Logs
Final Factory Restore According to certain embodiments, the core testing processor uses a reflection and command design pattern to invoke the relevant configured script(s) corresponding to each DUT being tested. For example, in the command design pattern one or more of the following are encapsulated in an object: an object, method name, arguments. According to certain embodiments, the core testing processor uses the Python "reflection" capability to execute the relevant test scripts for a given DUT. The core testing processor is agnostic of the inner workings of the relevant test scripts for a given DUT.

According to certain embodiments, lightweight software containers (virtualization containers) are used to abstract the connection of probes to the different DUT interfaces in order to avoid conflicts. Non-limiting examples of virtualization containers are Linux containers. As a non-limiting example, Linux container is an operating-system-level virtualization environment for running multiple isolated Linux systems (virtualization containers) on a single Linux control host. In other word, lightweight virtualization containers are used to ensure isolation across servers. By using virtualization containers, resources can be isolated, services restricted, and processes provisioned to have an almost completely private view of the operating system with their own process ID space, file system structure, and network interfaces. Multiple virtualization containers share the same kernel, but each virtualization container can be constrained to only use a defined amount of resources such as CPU, memory and I/O. The relevant test script connects to the DUT interfaces through the virtualization containers to execute the tests. The core testing processor receives the test results from running the relevant test scripts. The core testing processor can further process and interpret such results and can also send the results to the user's browser via web sockets. According to certain embodiments, the respective core testing processors are in communication (e.g., Telnet/SSH secure shell) with the virtualization containers (there may be multiple virtualization containers). The virtualization containers (probes) are in communication with corresponding DUT interfaces using Telnet/SSH/TCP/UDP/HTTP/HTTPS etc., as non-limiting examples.

According to certain embodiments, a system for testing a plurality of devices comprises: a universal tester; at least one test controller; a plurality of sets of testing probes; and a plurality of web sockets; wherein:

the plurality of devices includes a plurality of wireless router;

the universal tester is enabled for communication with a platform independent user interface through the plurality of web sockets;

the plurality of sets of testing probes comprising:

a plurality of LAN probes for testing corresponding LAN interfaces of a wireless router of the plurality of wireless routers;

at least one WLAN probe for testing a corresponding WLAN interface of the wireless router of the plurality of wireless routers;

at least one Ethernet WAN probe for testing a corresponding WAN interface of the wireless router of the plurality of wireless routers;

at least one MoCA LAN probe for testing a corresponding coax interface of the wireless router of the plurality of wireless routers;

at least one MoCA WAN probe for testing a corresponding coax interface of the wireless router of the plurality of wireless routers; and the plurality of web sockets enable real-time bi-directional and asynchronous communication between the platform independent user interface and the universal tester for simultaneously testing the plurality of devices under test by the universal tester.

According to certain embodiments, the system for testing a plurality of devices further comprises a MoCA LAN bridge.

According to certain embodiments, the system for testing a plurality of devices further comprises a MoCA WAN bridge.

According to certain embodiments, the system for testing a plurality of devices further comprises a splitter.

According to certain embodiments, the real-time bi-directional and asynchronous communication of the plurality of web sockets enables a user to control the testing of the plurality of devices simultaneously but asynchronously and independently of each other using the universal tester.

According to certain embodiments, the plurality of devices installed in the universal tester for purposes of simultaneous testing comprise a set of disparate devices.

According to certain embodiments, the plurality of devices installed in the universal tester for purposes of simultaneous testing comprise a set of similar devices.

According to certain embodiments, the testing system is adaptable to augmenting the test controller, the plurality of web sockets, the user interface and the plurality of sets of testing probes to accommodate testing of new types of devices.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A tester for simultaneously testing a plurality of wireless devices, comprising:
    a plurality of test slots, each test slot of the plurality of test slots configured to host a wireless device of a plurality of wireless devices; and
    a plurality of sets of test connections, each set of test connections of the plurality of sets of test connections being associated with one test slot of the plurality of test slots and comprising:
        a wireless networking test connection configured to test a corresponding wireless networking interface on a wireless device of the plurality of wireless devices, and
        an Ethernet test connection configured to test a corresponding Ethernet interface on a wireless device of the plurality of wireless devices.

2. The tester of claim 1, wherein the plurality of test slots comprise faraday cages.

3. The tester of claim 1, wherein the Ethernet test connection is configured to test a wide area network interface.

4. The tester of claim 1, wherein the Ethernet test connection is configured to test a local area network interface.

5. The tester of claim 1, wherein at least one set of test connections of the plurality of sets of test connections further comprises a MoCA test connection, and wherein the MoCA test connection comprises a MoCA local area network test connection and a MoCA wide area network test connection configured to test a corresponding coax interface on a wireless device of the plurality of wireless devices.

6. The tester of claim 5, further comprising a MoCA WAN bridge, a MoCA LAN bridge, and a splitter.

7. The tester of claim 1, further comprising at least one web socket for communicating with a user interface, wherein the at least one web socket enables real-time, bidirectional, and asynchronous communication with the user interface.

8. The tester of claim 1, wherein the tester is capable of simultaneously and independently testing the plurality of wireless devices.

9. The tester of claim 1, wherein the test connections are associated with software virtualization containers.

10. The tester of claim 9, wherein the software virtualization containers comprise Linux containers.

11. A method for simultaneously testing a plurality of wireless devices, comprising:
    associating a plurality of test slots with a plurality of wireless devices, each test slot of the plurality of test slots having a set of test connections to connect to a wireless device of the plurality of wireless devices; and
    communicating between a user interface and the plurality of sets of test connections via a plurality of web sockets in a real-time, bidirectional, and
    asynchronous manner,
    wherein each set of test connections
        uses a wireless networking test connection to test a wireless networking interface on a wireless device of the plurality of wireless devices, and
        uses an Ethernet test connection to test an Ethernet interface on a wireless device of the plurality of wireless devices.

12. The method for simultaneously testing a plurality of wireless devices of claim 11, wherein the plurality of test slots comprise faraday cages.

13. The method for simultaneously testing a plurality of wireless devices of claim 11, wherein the Ethernet test connection is configured to test a wide area network interface.

14. The method for simultaneously testing a plurality of wireless devices of claim 11, wherein the Ethernet test connection is configured to test a local area network interface.

15. The method for simultaneously testing a plurality of wireless devices of claim 11, wherein at least one set of test connections further comprises a MoCA local area network test connection and a MoCA wide area network test connection configured to test a corresponding coax interface on a wireless device of the plurality of wireless devices.

16. The method for simultaneously testing a plurality of wireless devices of claim 15, further comprising a MoCA WAN bridge, a MoCA LAN bridge, and a splitter.

17. The method for simultaneously testing a plurality of wireless devices of claim 11, wherein the real-time, bidirectional, and asynchronous communication of the plurality of web sockets enables a user to control the testing of the plurality of wireless devices simultaneously but asynchronously and independently of each other.

18. The method for simultaneously testing a plurality of wireless devices of claim 11, wherein the test connections are associated with software virtualization containers.

19. The method for simultaneously testing a plurality of wireless devices of claim 18, wherein the software virtualization containers comprise Linux containers.

* * * * *